United States Patent
Ahmavuo et al.

(10) Patent No.: US 6,351,842 B2
(45) Date of Patent: *Feb. 26, 2002

(54) METHOD FOR PRODUCING COMPUTER-CONTROLLED SERVICES

(75) Inventors: Pekka Ahmavuo; Martti Ala-Rantala; Pia Närvänen, all of Finnish (FI)

(73) Assignee: Nokia Telecommunications Oy, Espoo (FI)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/051,361
(22) PCT Filed: Oct. 9, 1996
(86) PCT No.: PCT/FI96/00530
    § 371 Date: Apr. 8, 1998
    § 102(e) Date: Apr. 8, 1998
(87) PCT Pub. No.: WO97/14097
    PCT Pub. Date: Apr. 17, 1997

(30) Foreign Application Priority Data

Oct. 11, 1995 (FI) .................................. 954838

(51) Int. Cl.[7] .............................................. G06F 9/45
(52) U.S. Cl. ................................... 717/1; 717/2; 717/3
(58) Field of Search ............................. 395/701, 702, 395/703, 705; 717/1, 2, 3, 5

(56) References Cited

U.S. PATENT DOCUMENTS

| | | | | |
|---|---|---|---|---|
| 5,075,847 A | * | 12/1991 | Fromme ......................... | 717/5 |
| 5,295,222 A | * | 3/1994 | Wadhwa et al. ................ | 717/3 |
| 5,499,371 A | * | 3/1996 | Henninger et al. ............. | 717/2 |
| 5,535,329 A | | 7/1996 | Hastings ........................ | 714/35 |
| 5,699,310 A | * | 12/1997 | Garloff et al. ................. | 717/1 |

FOREIGN PATENT DOCUMENTS

| | | | | |
|---|---|---|---|---|
| EP | 0 317 477 | 5/1989 | ............. | G06F/9/44 |
| EP | 0 625 748 | 11/1994 | ............. | G06F/9/44 |
| EP | 0 701 203 | 3/1996 | ............. | G06F/9/45 |
| WO | WO 9004227 | 4/1990 | ............. | G06F/9/00 |

OTHER PUBLICATIONS

James Rumbaugh et al., *Object Oriented Modeling and Design*, Chapter 3, pp. 21–56.

Ari Jaaksi, *Software Practice and Experience*, "Implementing Interactive Applications in C++", vol. 25(3), pp. 271–289.

Jaaksi, Implementing Interactive Applications in C++, Software—Practice and Experience, vol. 25(3), 271–289, Mar. 1995.*

(List continued on next page.)

Primary Examiner—Tuan Q. Dam
Assistant Examiner—Hoang-Vu Antony Nguyen-Ba
(74) Attorney, Agent, or Firm—Altera Law Group, LLC

(57) ABSTRACT

The invention relates to a method for producing application-specific computer-controlled services. An application-specific program code is generated automatically and an application-specific computer program for providing the service is formed. In order to perform changes more easily than before, the computer program is divided into three groups. The first group is formed only of such a code that remains the same regardless of the application, and the second and the third group are provided with a code produced by the generation in such a way that (a) the second group only includes a code produced by the generation and (b) the third group contains a code produced with the generation that is to be changed by the designer after the generation. The generating device is informed of whether the code to be generated is produced for the second or for the third group.

10 Claims, 8 Drawing Sheets

OTHER PUBLICATIONS

Aizman, Application framework for rapid agent development, IEEE, Mar. 1998.*

Nakajima–Tomobe–Miki–Hayashi, Object–oriented development methodology for telecommunication network management software, IEEE, May 1996.*

Englehart, High quality automatic code generation for control applications, IEEE, May 1994.*

* cited by examiner

FIG. 3a

Base station radio network parameters

File | Settings | Help

Identifier
Name
Max. transmit power
Min. transmit power

[Update]
[Select base station...]

FIG. 3b

Selection of base station

[Select]
[Close]
[Help]

FIG. 7

Base station radio network parameters

File | Settings | Help

Identifier
Name
Max. transmit power
Min. transmit power
Priority mode    Yes ☐    No ☐

[Update]
[Select base station...]

FIG. 9

Updating parameters

Updating radio network parameters, please wait...

[OK] [Cancel]

FIG. 5

```
( application "abcradionetmx" # application name
        # application specific declaration
        ( program_block_prefix "abc" )      # from varki
        ( family_id     "ABCRAD") # from wmslibmx.h
        ( type          "UI" ) #
        ( skeleton_test "yes" )
        ( main_controller ""
                # main view
        ( view ""
                (type "basic_application_base")
                ( public_method "#abc1# void ShowParametersFM( name_t nimi,
                        intID_t tunnus, float maxPower, float minPower)"
                )
                ( abs_partner ""
                ( abs_partner_method
                        "#abc2# void:: AbcUpdateButtonActivated( name_t name,
                        intID_t identifier,float maxPower, float minPower)"
                )
                ( abs_partner_method
                        "#abc3# void ::AbcSelectButtonActivated()"
                )

)

)
        ( sub_controller "selection"
                ( public_method "#abc4# void EnterBasestation()" )
                ( view ""
                        ( type "basic_close_help_dialog" )
                        ( public_method
                        "#abc5# void SetElementsfm(ElementList_t elements)"
                        )
                        ( abs_partner ""
                                ( abs_partner_method
                                "#abc6# void ::AbcAlkioSelected(int alkio)"
                                )
                        )
                )
                        ( abs_partner ""
                                ( abs_partner_method
                                "#abc7# void ::AbcOhjainSelected(intID_t tunnus)"
                                )
                        )
                )
        )
)
```

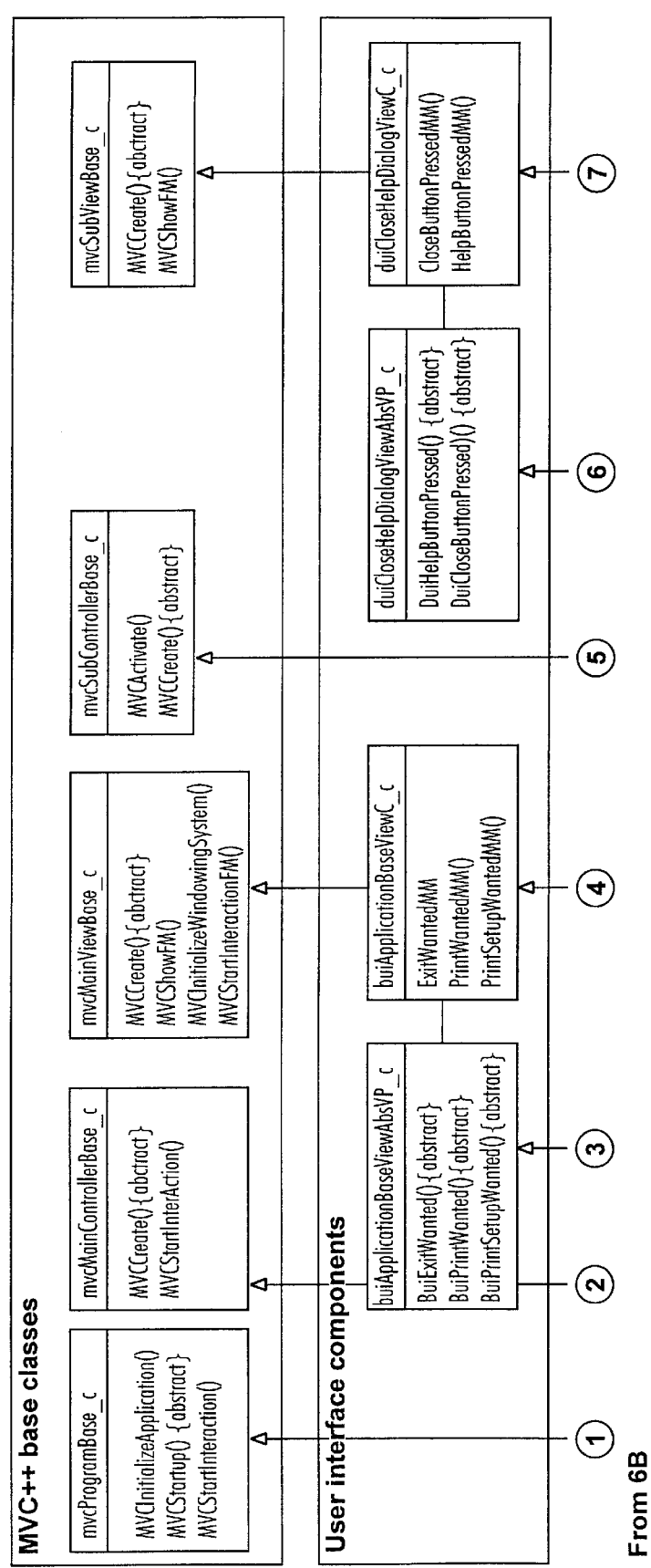

METHOD FOR PRODUCING COMPUTER-CONTROLLED SERVICES

FIELD OF THE INVENTION

The invention relates generally to systems similar to network management systems that are provided by means of software with services by means of which the end user uses the system, for example controls the apparatuses in the network. More precisely, the invention relates to a method for producing application-specific computer-controlled services for a user of such a system. The invention also relates to a system for producing application-specific computer-controlled services.

DESCRIPTION OF RELATED ART

There are several systems intended for code generation in the market. Such generators are typically intended for use at the beginning of programming and they cannot be used for making significant changes in finished applications rapidly and without any mistakes. In other words, known generators do not provide sufficient support for repeated changes and additions.

Several applications are also such that it should be possible to make changes therein as rapidly and correctly as possible. An example of such an application is a network management system wherein the network to be managed comprises several apparatuses of different types and the network changes continuously as the operator acquires devices from several different manufacturers and performs updatings on existing devices and their software. Especially with the new free competition in the field of telecommunications a need has occurred to continuously provide the users with new services, which further increases the importance of flexible possibilities of change.

The known systems are not very well suitable for applications of the type described above. This is for example due to the fact that the systems provide the designer with a great deal of detailed and therefore also secondary information from which it is difficult to find the essential parts (to which the changes are directed). The designer must also be able to control (understand) this information. Therefore the person who makes the changes must be an expert in the field of programming.

In such a system, there is also the danger that the designer changes such a part of the software that is not to be changed.

SUMMARY OF THE INVENTION

The purpose of the present invention is to eliminate the aforementioned drawback by providing a new type of arrangement for producing an application-specific service. This object is achieved with the method according to the invention that is characterized by what is described in the characterizing portion of the appended claim 1.

The idea of the invention is to create an environment where changes are as simple and clear as possible for the designer. This is possible by placing separately the code to be generated (a) in such a part (containing the default functionality) that the designer can ignore during the changes (so that it can be invisible) and (b) in a part that is visible to the designer and that requires changes to be made by the designer in each situation of change. The separation is based on the use of special template files and the changes are carried out by making a change corresponding to the change in the description file of the application, by regenerating the application framework and by thereafter making, if required, the changes that are to be carried out manually by the designer. In connection with the generation, the code generator modifies the template files on the basis of the description file of the application.

Due to the arrangement according to the invention, changes can be carried out rapidly and as faultlessly as possible. The product to be delivered to the user of the service can thus be made faultless rapidly. Due to the invention, it is even possible that changes are made by a person employed by the organization, such as the network operator, using the service, in which case the changes will be as flexible as possible.

The above-described advantages are based on the fact that the system increases the abstraction level of the designer's work; the designer only sees the essential part (the parts requiring changes) of the application and the secondary matters (the complicated program code) are invisible. Therefore it is easier for the designer to locate the parts to which changes must be made. At the same time, this also decreases the possibility for the designer to accidentally change parts that are not to be edited.

BRIEF DESCRIPTION OF THE DRAWINGS

In the following, the invention and the preferred embodiments thereof will be described in greater detail with reference to the examples according to the accompanying drawings, in which FIG. 3a shows the main window in an illustrative application, FIG. 3b shows a subwindow of the illustrative application, FIG. 5 shows an application description supplied to the code generator, FIG. 7 shows the main window of the application in its changed form, FIG. 9 illustrates another change to be made to the application.

DETAILED DESCRIPTION OF THE INVENTION

Figure 1:
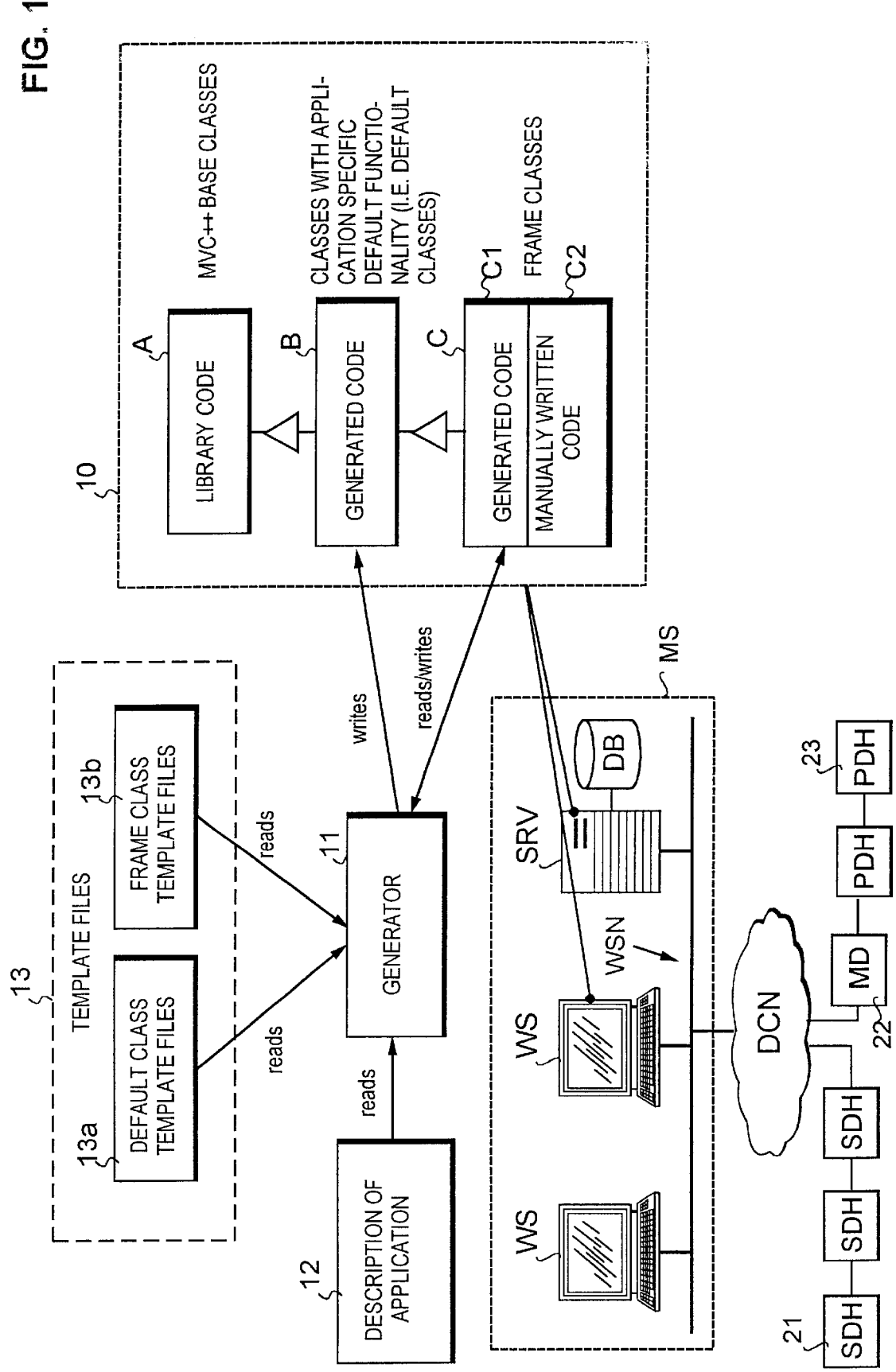
FIG. 1 illustrates a system according to the invention.

FIG. 1 illustrates the network management system according to the invention. An object-based program, based on the MVC++ application architecture (and the use of the C++ programming language), is used as an example. It can generally be stated that the method requires the use of a simple application architecture, for example the MVC++ architecture. Since this architecture will be used as an example below, such features that facilitate the understanding of the following description will be described shortly in this connection.

The MVC++ architecture is modified from the known MVC (Model-View-Control) architecture and according to it the application is divided into three parts: model, view and control. The model part is a collection of objects describing the area of the real world to which the application relates. The view part is the outmost layer of the application, visible to the end user. This part determines what the user sees on the monitor. The view part is divided into a visual and functional part. The visual part manages the layout of the display and the functional part controls the functionality related to the display. The view part is created by the controller part, and for each view object there is one controller object. The controller part controls the cooperation of the model and view parts and forms the application-specific logic. One controller object may have a relation to several model objects and the same model object may be connected to several controller objects. In the application according to the MVC++ architecture, the objects of the model part and the view part are not directly connected to each other, but a view object can communicate with a model object only via a controller object. Therefore the view part interprets a command given by a user from the workstation and indicates to the controller part which function is in question. The controller part contains the knowledge about how each command is to be processed, so that the controller part requests the model part to carry out the measures corresponding to the command. The model part informs the controller part of the results of the measures, and the controller part in turn asks the view part to show them to the user. Each application according to the MVC++ architecture has a main controller class, i.e. a main controller, that controls the other controller classes and thus the entire application. Also, a main controller object creates a main view object and controls it. The main view object forms the main window of the application. For every other window (dialog) there are separate view and controller classes.

A more detailed description of the MVC++ architecture is provided for example in Implementing Interactive Applications in C++ by A. Jaaksi (Software Practice & Experience, Volume 25, No. 3, March 1995, pp. 271–289).

The network management system according to the invention can be in practice for example such as shown in FIG. 1. Network operators sitting in operation and maintenance centres MS use network management workstations WS connected to a separate workstation network WSN that may be for example an Ethernet network. The management system is typically divided into several computers of the workstation network, some of the computers comprising a database DB containing the data required to control the network. The management system is connected via a Q3 interface defined in the standards for example to a transmission network DCN that may comprise for example SDH devices 21 and PDH devices 23. The control channels between the SDH devices are formed in practice in header bytes of an STM-N signal (N=1,4,16), so the control signals between the SDH devices travel together with the payload signal (i.e. also in the same physical network). Conventional PDH devices 23 in turn require arrangements that are specific for each manufacturer, wherefore they must be connected to the management system via a separate mediation device 22.

The system according to the invention comprises a code generator 11 that automatically generates a part of the application-specific computer program 10 used in the system and called hereinafter an application framework. This is the program framework that is run when the operator uses the network management services from his workstation. The finished application is stored in a server or an individual workstation of the workstation network (or in both).

A high abstraction level description of the application is formed for the generator, the description forming the first input group of the generator. This description is denoted with reference numeral 12. The description can be written for example manually directly into a text form understood by the generator and the description can thereafter be stored as a file in the system memory. The description can also be produced with a known CASE (Computer Aided Software Engineering) device where the application is displayed as a graphic description. In this case, the description stored in the file by the CASE device is converted into a form understood by the generator with a special conversion program.

Another input group to the generator consists of template files 13 acting as models to the generation of the application framework. The code generator 11 generates the application framework by regenerating the code to the template files on the basis of the description 12 written by the designer. The template files are divided into two groups, 13a and 13b, and a certain part of the application framework is generated on the basis of each group. The template files are fixed files that do not have to be changed when the application is modified. In this respect, the template files could also be considered to be a part of the internal implementation of the code generator 11.

From the above-described two input groups the code generator forms its own part (denoted in FIG. 1 with the term "generated code") of the application-specific computer program 10 (i.e. the application framework) shown on the right side of FIG. 1. According to the invention, the application framework is divided into three different groups or layers A to C in such a way that the properties of group A are inherited to group B and the properties of group B are inherited to group C. In FIG. 1, the inheritance is indicated with a triangle pointing upwards.

The first group A (the lowermost layer; even though the layer is shown in the figure as the uppermost one, it is the lowest layer for the designer) only contains such a program code that remains the same regardless of the application. Therefore this group does not have to be created specifically, but it remains the same from one application to another. The group contains the functionality that remains the same from one application to another. Even though some changes would have to be made to the application or the application would be changed altogether, this group always remains the same. In this example, the first group consists of MVC++ base classes (that are the same for all applications).

The second group B (the middle layer) and the third group C (the uppermost layer) are provided with a program code produced with the code generator 11. The division is performed in such a way that the second group is only provided with a program code produced by means of the generator and the third group in turn is provided with a code produced both by the generator and manually by the designer. During the generation, the third group is therefore provided with a code to which the designer is intended to make changes, e.g. additions. After the generation, the designer makes the necessary changes to the third group. The third group is therefore divided in its final form into two parts: part C1 that only contains a code produced by the generator and part C2 that contains a code produced manually by the designer.

The second group B comprises the classes that contain the application-specific default functionality. These classes are generated by means of the generator in a manner described below, and the designer does not have to make any changes in this group at any stage. This default functionality is dependent on the application structure and the services connected thereto, and it can be changed in such a way that the properties the designer has added to the application (i.e. to group C) are retained. The second group is generated on the basis of the corresponding template files (13a) and the description 12. The classes of the second group are stored in the system into their own files which do not contain a code written manually by the designer. These classes will be called below default classes.

The third group (C) consists of skeleton classes that are classes to which the designer manually writes an additional functionality required by the application. Due to the technical properties of programming languages, changes must also be made to the skeleton classes during the regeneration of the application framework. For that purpose, the code (part C1) to be regenerated is separated from the rest of the code (part C2) in the files containing the skeleton classes. The separation employs character strings which are reserved especially for this purpose and on the basis of which the generator recognizes the parts of the files that are to be regenerated during the changes.

Information about whether the code to be generated is a part of the default classes (i.e. group B) or the skeleton classes (i.e. group C) is given to the generator by means of the template files. For this purpose, the template file section 13 comprises specifically a part corresponding to group B, i.e. the template files 13a of the classes containing the default functionality, and a part corresponding to group C, i.e. the template files 13b of the skeleton classes. The template files of the default classes are a model to the functionality that can be implemented automatically on the basis of the description file 12. By means of the template files 13b of the skeleton classes one generates the frames that are supplemented by the designer with the code that cannot be automatically generated. The accompanying appendix 1 uses the template files of the default and skeleton main controller classes as examples.

When the application framework is created for the first time, the code generator writes the required code into groups B and C. When changes are to be made to the final application, the generator rewrites groups B and C. The generator can rewrite group B in full on the basis of the changed input data, but the contents of group C (skeleton classes) must be read first so that the generator recognizes the part added manually by the designer so that it can be left as it is.

When the code to be generated is such that it contains a code of the generator, the code to be generated is supplemented with an identifier by means of which the code to be generated and the manually written code are connected. This will be described in greater detail below.

The generator reads template files. When the generator finds a certain character string reserved for this purpose from the template files, it replaces the string with the code part it has generated. The generator forms these code parts according to its own generation rules and the application description. The generation rules depend on the application architecture used, but they are independent of an individual application. (The generation rules therefore form a kind of a function providing a result that is dependent on the parameter used, i.e. on the description 12 of the application.)

As it is apparent from what is stated above, the application framework to be generated has the following characteristics:
1. The manually written code and the automatically generated code are separated from one another by dividing the application into default classes and skeleton classes.
2. The manually written code and the code to be generated are separated within the skeleton classes by means of character strings reserved for this purpose.
3. The manually written code and the code to be generated are combined with special identifiers when the code to be generated contains a directly manually written code.

Figure 2:
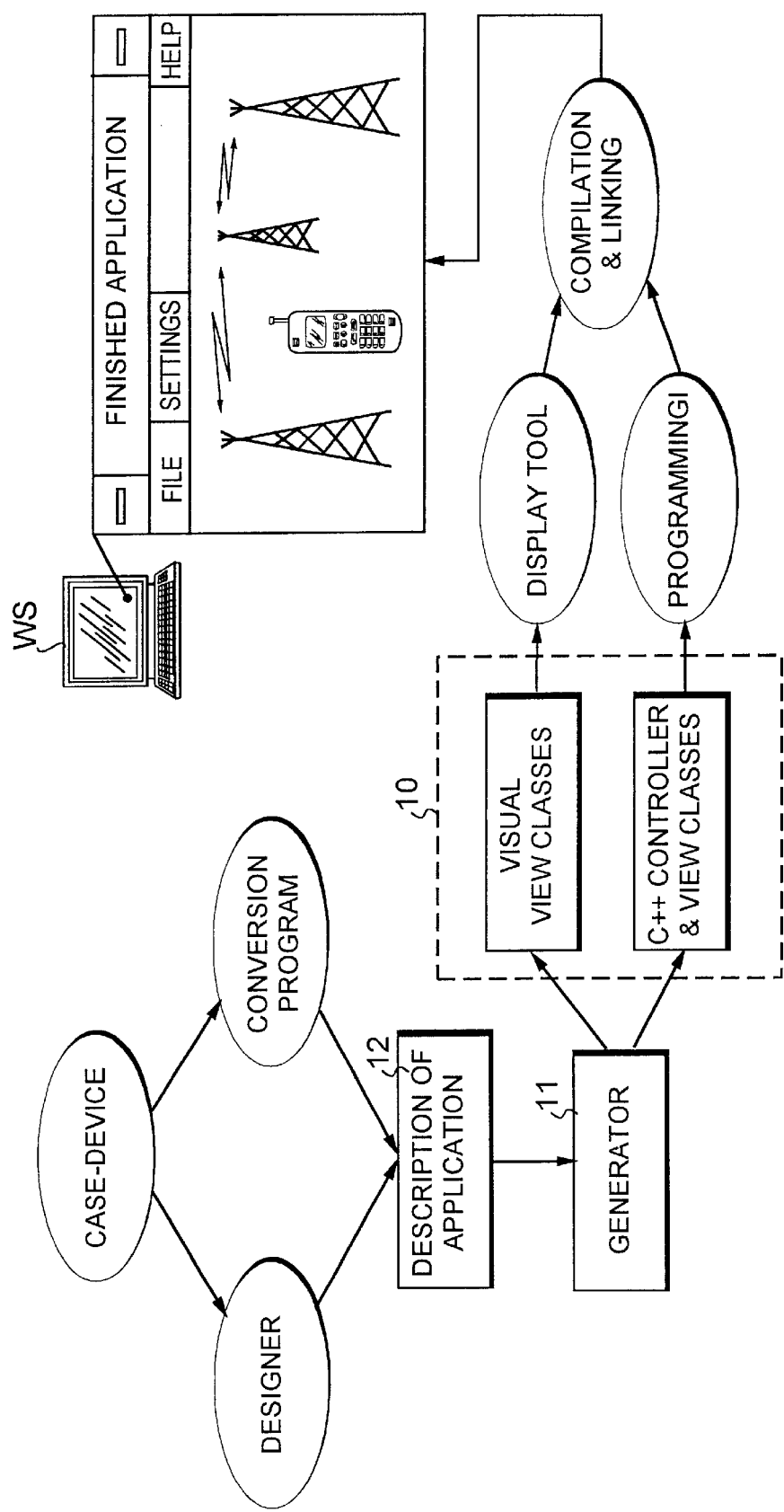
FIG. 2 shows the generation of a finished application with the system according to the invention.

FIG. 2 illustrates an example of the generation of a finished application with the method according to the invention. The designer first makes an object diagram e.g. with a CASE device. The description is converted into a form understood by the code generator 11 either by writing it manually or alternatively by means of a conversion program. The code generator then generates the application framework 10 consisting in this example of files in the C++ language (controller classes and functional view classes) and of files (visual view classes) in the format of the user interface tool (e.g. X-Designer™, the trademark of Imperial Software Limited). The designer supplements the functionality of the application by means of manual coding and (e.g. the aforementioned) user interface tool of the user interface. The program can then be compiled and linked as a program to be run for example in a network management system where the network and its network elements (physical devices) are controlled from a workstation WS via a transmission network. The above-described development tools can also be located in one workstation of the network management system so that the operator personnel can make themselves the changes required in the network management system.

In the following, the implementation of the application will be illustrated by using as an example an imaginary application The radio network parameters of the base station related to the network management, the application making it possible to view and set parameters related to the radio network of the base station.

FIG. 3a shows the main window of the application as it is seen on the display of the workstation WS of the control centre in the network management system MS of FIG. 1. The application is started from the main user interface of the network management system, and the main window of the application then appears on the display. The data related to the transmission power of the base station can be read and set from this main window. The application also comprises one subwindow that is shown in FIG. 3b. The base station to be treated can be selected from this subwindow.

Figure 4:
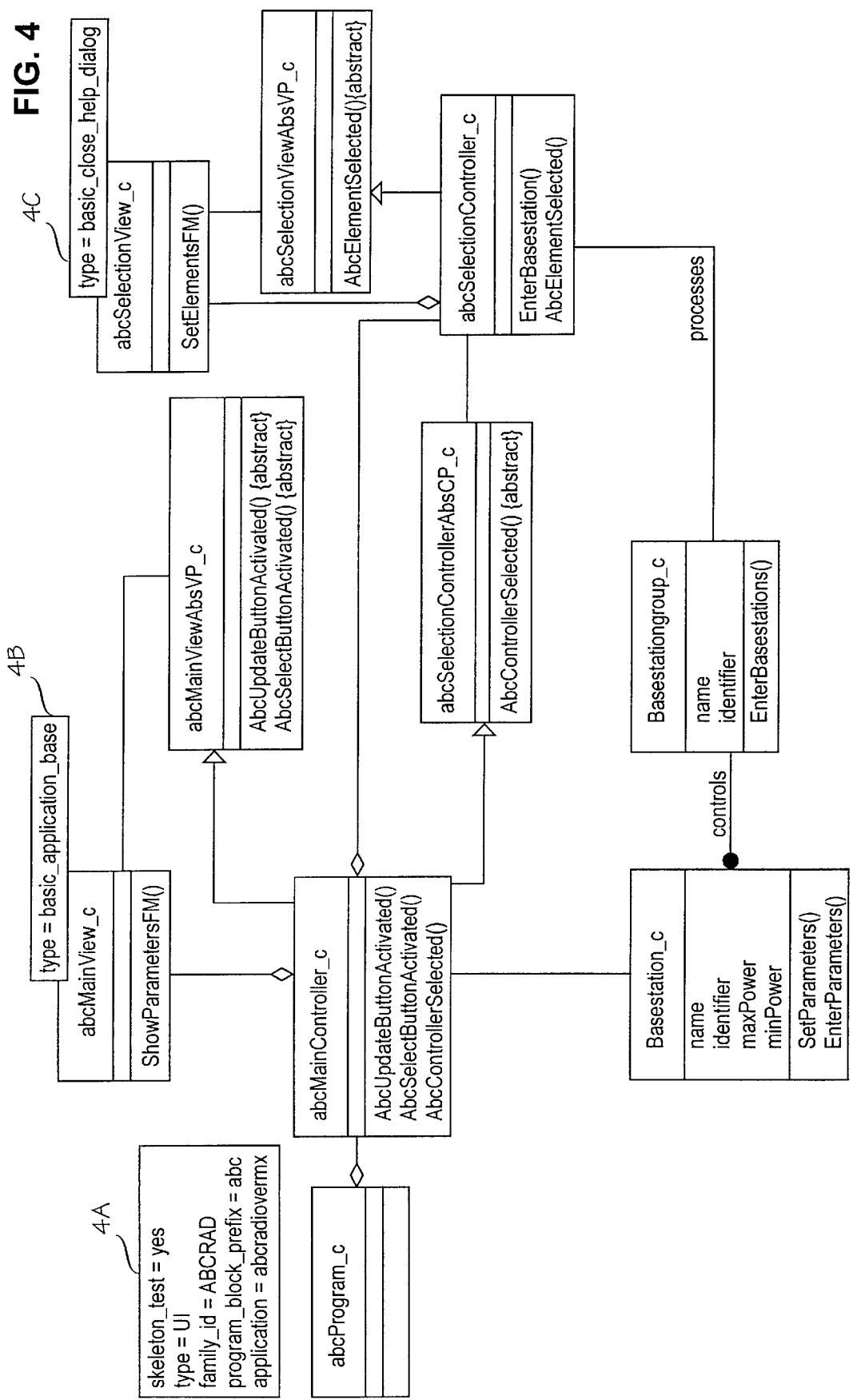
FIG. 4 shows an object model of the illustrative application.

The designer first draws with the CASE device an object model describing the application. The obtained model is shown in FIG. 4, employing the commonly used OMT notation described for example in *Object Oriented Modelling and Design* by James Rumbaugh et al. (Prentice-Hall, New Jersey, USA, 1991, chapter 3). (It should be mentioned that the frame 4a shown on the left side of FIG. 4 and not connected to any class provides additional information about the entire application described in greater detail below. By means of the view type definitions 4B and 4C, the user interface components inherited to the view classes are selected.)

This graphic description is converted by a conversion program or by manually writing into a form understood by the code generator. The code thus obtained is shown in FIG. 5. In order to understand this description file, the accompanying appendix 2 shows the syntax of the description language used. (FIG. 5 shows by means of parenthetical expressions a similar hierarchial structure as shown in FIG. 4 with the OMT notation).

Figure 6B:
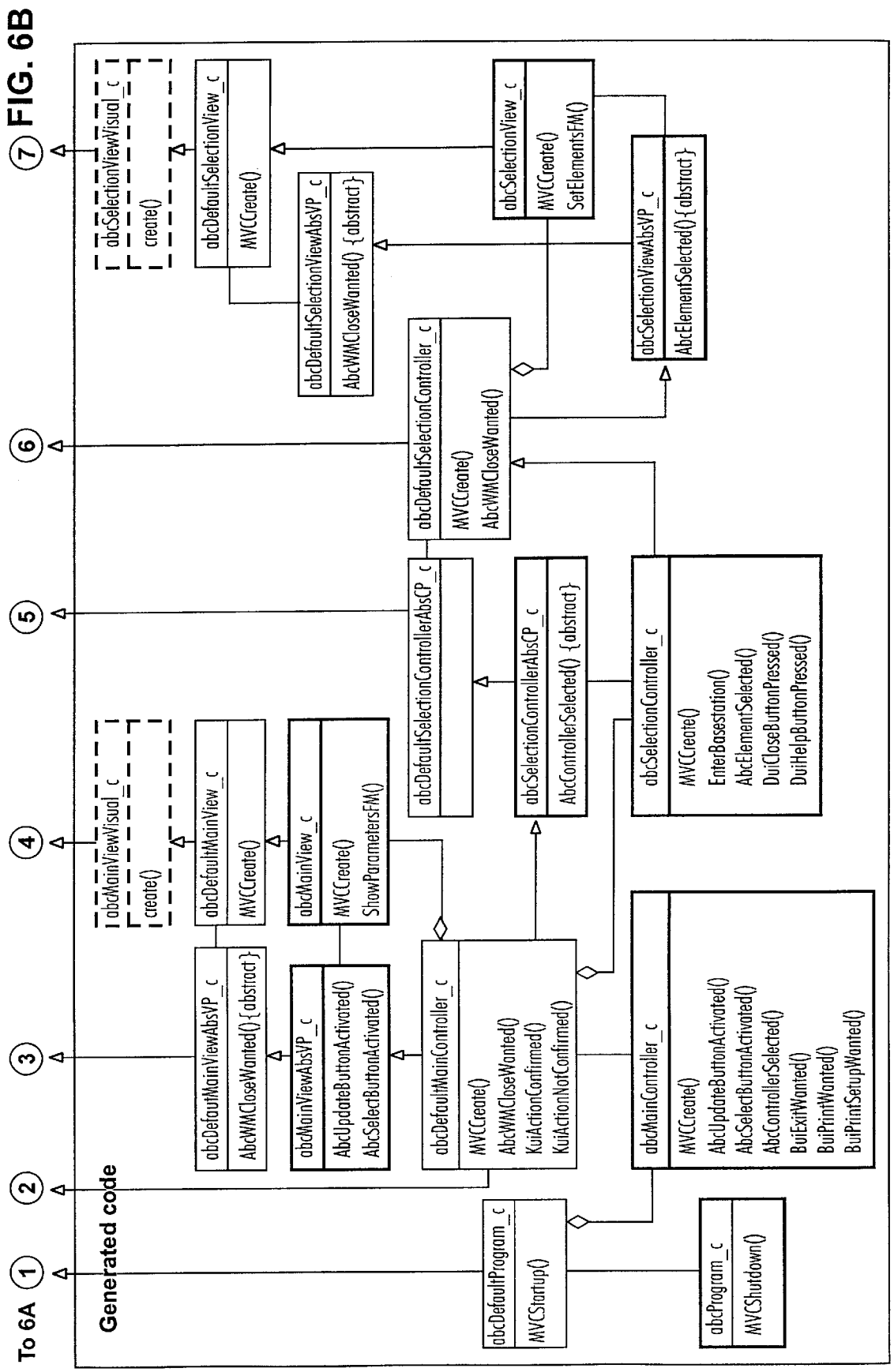
FIG. 6 shows a generated application framework.

The application framework 10 is then generated by using the application generator 11. The listing shown in FIG. 5 is then generated into the application framework shown in FIG. 6. FIG. 6 shows the above-described group division in such a way that of the generated code, the classes belonging to group B (i.e. the default classes) are depicted with thin frames and the classes of group C (i.e. the skeleton classes) are shown with thick frames. The programmer thus sees from the application framework as the C++ source code the (view, controller and abstract partner) classes shown with thick frames. The designer implements the functionality of the application by adding a necessary amount of code to theses skeleton classes. (Abstract partner is a class describing what an object expects from a calling object. Since the concept of abstract partner is not related to the actual inventive idea, it will not be described in greater detail in this connection. A more thorough description of the abstract partner is provided in the aforementioned article on the MVC++.)

The designer implements the layout of the user interface by editing the visual view classes (the classes shown in the figure with broken thick frames) with a user interface tool (e.g. X-Designer™). The other classes shown in FIG. 6 are not visible to the designer. (The user interface components shown in the figure and inherited to the visual view classes are selected on the basis of the view type definition set forth in the description file 12.)

When FIGS. 4 and 6 are compared, it becomes apparent how the arrangement according to the invention makes it possible to increase the abstraction level of the programming work. A description on the abstraction level of FIG. 4 can be converted into the (rather complicated) class hierarchy of FIG. 6. Of the classes of FIG. 6, the designer only sees the classes depicted with thick frames, so the designer also sees the generated code on a high abstraction level.

The naming of the classes to be generated employs the naming rule shown in the following table. In the table the character string "abc" is a three-letter prefix of the application given in the description file (FIG. 5).

| | |
|---|---|
| AbcDefaultProgram_c | application default main program class |
| abcProgram_c | application skeleton main program class |
| abcDefaultMainController_c | application default main controller class |
| abcMainController_c | application skeleton main controller class |
| abcDefaultMainView_c | application default main view class |
| abcMainView_c | application skeleton main view class |
| abcDefaultMainViewAbsVP_c | application default main view abstract partner class |
| abcMainViewAbsVP_c | application skeleton main view abstract partner class |
| abcDefault<Sub>Conroller_c | default subcontroller class where <Sub> is the subcontroller name given in the description file |
| abc<Sub>Controller_c | skeleton subcontroller class where <Sub> is the controller name given in the description file |
| abcDefault<Sub>ControlleraAbsCP_c | default subcontroller abstract partner class where <Sub> is the subcontroller name given in the description file |
| abc<Sub>ControllerAbsCP_c | skeleton subcontroller abstract partner class where <Sub> is the controller name given in the description file |
| abcDefault<Sub>View_c | default subview class where <Sub> is the subcontroller name given in the description file |
| abc<Sub>View_c | skeleton subview class where <Sub> is the controller name given in the description file |
| abcDefault<Sub>ViewAbsVP_c | default subview abstract partner class where <Sub> is the subcontroller name given in the description file |
| abc<Sub>ViewAbsVP_c | skeleton subcontroller abstract partner class where <Sub> is the controller name given in the description file |

The following items A to E show as an example the generation of the declaration of the default main controller class (the class "abcDefaultMain-Controller_c" of group B) on the basis of the template file and the data in the description file. The frames show the parts of the files that are changed. The frame has on one line an arrow, and the part preceding the arrow describes the situation before the change and the part following the arrow in turn describes the situation after the change.

A. The name of the class is obtained by replacing the character string "fft" in the class name (cf. appendix 1) of the template file with an application prefix provided in the description file, in this case "abc":

```
class fftDefaultMainController_c
=> class abcDefaultMainController
```

B. The name of the main view abstract partner class to be inherited to the default class is obtained by replacing from the character string "fftMainViewAbsVP_c" the part "fft" with "abc". The names of the subcontroller abstract partner classes to be inherited to the main controller are formed according to the naming rule. They are formed into a character string where the names of the abstract partner classes are separated with a comma and a line feed character. The character string thus obtained replaces the character string INHERIT_ABS in the template file:

```
:public mvcMainControllerBase_c,
  public kuiConfirmationDialogControllerAbsCP_c,
  public fftMainViewAbsVP_cINHERIT_ABS
=>
:public mvcMainControllerBase_c,
  public kuiConfirmationDialogControllerAbsCP_c,
  public abcMainViewAbsVP_c,
  public abcSelectionControllerAbsCP_c
```

C. In the declaration of the methods of the public part in the template file, the character string "fft" is replaced with "abc":

```
{
public:
    fftDefaultMainController_c(fftDefaultProgram_c *fftPrg);
    virtual ~fftDefaultMainController_c();
    virtual errAtom_c *MVCCreate();
    // defived from abs. view partner
    virtual void FftWMCloseWanted();
    // confirmation controller abstract partner
    // methods
    virtual void KuiActionConfirmed();
    virtual void KuiActionNotConfirmed();
=>
{
public:
    abcDefaultMainController_c(abcDefaultProgram_c *abcPrg);
```

```
    virtual ~abcDefaultMainController_c();
    virtual errAtom_c *MVCCreate();
    // defived from abs. view partner
    virtual void AbcWMCloseWanted();
    // confirmation controller abstract partner
    // methods
    virtual void KuiActionConfirmed();
    virtual void KuiActionNotConfirmed();
```

D. In the declaration of the protected part of the template file, the character string "fft" is replaced with "abc" and MAINVIEW_C is replaced with a main view name formed according to the naming rule. The character string SUB_CONT_DECLARATIONS is replaced with a character string formed in the following manner:

The following steps are repeated for each subcontroller defined in the description file:

1. A character string according to the naming rule is formed as the name of the subcontroller class on the basis of the name given with the sub_controller definition of the template file.
2. The character string is supplemented in order with a space character and an asterisk.
3. If an instance name has been defined for the subcontroller by means of the instance definition, it is added to the character string, otherwise a name given with the sub_controller definition is added to the character string.
4. The character string is supplemented with a semicolon and a line feed character.

The character strings thus obtained are combined.

```
protected:
    mvcMainViewBase_c *MVCGetMainView();
    MAINVIEW_C        *view;
    fftDefaultProgram_c    *fftProgram;
    // confirmation dialog
    kuiConfirmationDialogControllerC_c *confirmationDialog;
    SUB_CONT_DECLARATIONS
=>
protected:
    mvcMainViewBase_c *MVCGetMainView();
    abcMainView_c        *view;
    abcDefaultProgram_c    *abcProgram;
    // confirmation dialog
    kuiConfirmationDialogControllerC_c *confirmationDialog;
    abcSelectionController_c *selection;
```

E. The private part is formed by replacing the character string "fft" with "abc" given in the description file 12:

```
private:
    fftDefaultMainController_c(const fftDefaultMainController_c &);
    fftDefaultMainController_c operator=
        (const fftDefaultMainController_c & ) const;
};
=>
private:
    abcDefaultMainController_c(const abcDefaultMainController_c & );
    abcDefaultMainController_c operator=
        (const abcDefaultMainController_c & ) const;
};
```

The files generated from the illustrative application are shown in the table below:

Skeleton classes to which the programmer encodes the additional functionality required by the application:

| file | class |
|---|---|
| abcviewmainmx.h | abcMainView_c, abcMainViewAbsVP_c |
| abcviewmainmx.cc | abcMainView_c |
| abcvivalintmx.h | abcSelectionView_c, abcSelectionViewAbsVP_c |
| abcvivalintmx.cc | abcSelectionView_c |
| abccovalintmx.h | abcSelectionController_c, abcSelectionControllerAbsCP_c |
| abccovalintmx.cc | abcSelectionController_c |
| abccontmainmx.h | abcMainController_c |
| abccontmainmx.cc | abcMainController_c |
| abcmainprogmx.h | abcMainProgram_c |
| abcmainprogmx.cc | abcMainProgram_c |

File where the version number of the application is set:
abcyourbvermx.h

Description in the format of the user interface tool about the visual view classes
The visual skeleton classes are generated on the basis of the view type determination, e.g (type "basic_application_base")

| file | class |
|---|---|
| abcvsmainvimx.xd | abcMainViewVisual_c |
| abcvsvalintmx.xd | abcSelectionViewVisual_c |

Classes containing the application-specific default functionality:

| file | class |
|---|---|
| abcviewmadfmx.h | abcDefaultMainView_c, abcDefaultMainViewAbsVP_c |
| abcviewmadfmx.cc | abcDefaultMainView_c |
| abcvdvalintmx.h | abcDefaultSelectionView_c, abcDefaultSelectionViewAbsVp_c |
| abcvdvalintmx.cc | abcDefaultSelectionView_c |
| abccdvalintmx.h | abcDefaultSelectionController_c, abcDefaultSelectionControllerAbsCP |
| abccdvalintmx.cc | abcDefaultSelectionController_c |
| abccontmadfmx.h | abcDefaultMainController_c |
| abccontmadfmx.cc | abcDefaultMainController_c |
| abcmainprdfmx.h | abcDefaultMainProgram_c |

Visual view classes in the C++ language. The code generator starts the XDesigner user interface tool that generates the visual view classes from the descriptions in the XDesigner format.

-continued

| file | class |
|---|---|
| abcvsmainvimx.cc | abcMainViewVisual_c |
| abcvsmainvimx.h | abcMainViewVisual_c |
| abcvsselectmx.cc | abcSelectionViewVisual_c |
| abcvsselectmx.h | abcSelectionViewVisual_c |

File containing data about the generated application framework:
README.1st
Makefile for compiling the application:
abcyourbankmx.mak As the table and FIG. 4 show, one controller class of the application description is converted into two classes: a skeleton class (belonging to group C) and a default class (belonging to group B). The view classes in turn are converted into three classes: for the functional part of the view, default and skeleton classes, and for the visual part of the view, only a skeleton class (since this part can be processed with the user interface tool on a level higher than the source code), In the following, examples of main controller default and skeleton classes are shown. The header and implementation files of the default class are shown first and the header and implementation files of the skeleton class are shown next. A header file shows the interface of the object visible to the outside, i.e. the functions that another object can call. An implementation file in turn contains the actual code that is performed when a function is called.

The header file (in the C++ language) "abccontmadfmx.h" of the default main controller class is as follows (when the template file shown in the appendix has been amended in the above-described manner):

```
/***************************************************
**
*  *
*  *   $RCSfile$
*  *
*
***************************************************
*  *
*  *   $Author$
*  *
*      Copyright (c) Nokia Telecommunications 1991–1995
*
***************************************************
*  *
*  *   Application Framework generated file
*  *   This is a header file for default main controller class.
*  *   You should not edit this file!!
*  *   RUNGOXMX version: @(#) Version 1.9 (t8mcl)
*  *
*
***************************************************
*  *
*  *   $Log$
*
*************************************************** ifndef ABCDEFAULTMAINTCONTROLLER_H
define ABCDEFAULTMAINTCONTROLLER_H
/* MODULE IDENTIFICATION
***********************************************/
static char abccontmadfmx_rcsid[] = "$Id$";
#include <stdio.h>
```

-continued

```
#include <stdlib.h>
#include <weratomx.h>        // Errors
#include <kuicocfmdlgmx.h>   // controller confirmation dialog
#include "abcviewmainmx.h"   // Main View and abstract view partner
// header files of sub controllers
#include "abccoselectmx.h"
class abcDefaultProgram_c;
class abcDefaultMainController_c
:public mvcMainControllerBase_c,
 public kuiConfirmationDialogControllerAbsCP_c,
 public abcMainViewAbsVP_c,
 public abcSelectionControllerAbsCP_c
{
public:
    abcDefaultMainController_c(abcDefaultProgram_c *abcPrg);
    virtual ~abcDefaultMainController_c();
    virtual errAtom_c *MVCCreate();
    // defived from abs. view partner
    virtual void AbcWMCloseWanted();
    // confirmation controller abstract partner
    // methods
    virtual void KuiActionConfirmed();
    virtual void KuiActionNotConfirmed();
protected:
    mvcMainViewBase_c *MVCGetMainView();

abcMainView_c        *view;
    abcDefaultProgram_c  *abcProgram;
    // confirmation dialog
    kuiConfirmationDialogControllerC_c *confirmationDialog;
    abcSelectionController_c *selection;
private:
    abcDefaultMainController_c( const abcDefaultMainController_c & );
    abcDefaultMainController_c operator=
        (const abcDefaultMainController_c & ) const;
};
#endif
/* ABCDEFAULTMAINCONTROLLER_H */
```

The implementation file "abccontmadfmx.cc" of the default main controller class is as follows:

```
/***************************************************
*
*  *
*  *   $RCSfile$
*  *
*
***************************************************
*  *
*  *   $Author$
*  *
*  *   Copyright (c) Nokia Telecommunications 1991–1995
*
```

-continued

```
****************************************************
*  *
*  *  Application Framework generated file
*  *  This is a implementation file for default main controller class.
*  *  You should not edit this file!!
*  *  RUNGOXMX version: @(#) Version 1.9 (t8mcl)
*  *
*
****************************************************
*  *
*  *  $Log$
```

```
*
****************************************************
// MODULE IDENTIFICATION
****************************************************
static char rcsid[] = "$Id$";
#include "abccontmadfmx.h" // Header of this main controller
#include "abcmainprogmx.h" // Header of program module
// message text for WM close confirmation dialog
const char *closeText =
"This will close the application.\nDo you want to
proceed?";
/****************************************************
*
* <PUBLIC> FUNCTION:
abcDefaultMainController_c::abcDefaultMainController_c()
****************************************************
*
*
* Constructor.
*
****************************************************
*/
abcDefaultMainController_c::abcDefaultMainController_c
(
 abcDefaultProgram_c *abcPrg
)
{
   abcProgram = abcPrg;
   view = 0;
   confirmationDialog = 0;
   selection = 0;
}
```

```
/****************************************************
*
* <PUBLIC> FUNCTION:
abcDefaultMainController_c::~abcDefaultMainController_c()
****************************************************
*
*
* Destructor
*
****************************************************
*/
abcDefaultMainController_c::~abcDefaultMainController_c()
{
   view->MVCHideFM();
   delete view;
   view = 0;
   delete confirmationDialog;
delete selection;
selection = 0;
}
/****************************************************
*
* <PRIVATE> FUNCTION: errAtom_c *abcDefaultMainController_c::
MVCCreate()
****************************************************
```

-continued

```
*
*
* Controller creation
*
****************************************************
*/
errAtom_c
*abcDefaultMainController_c::MVCCreate()
{
   errAtom_c *err = 0;
   // Instantiate The MainWindow
```

```
   //
   view = new abcMainView_c( this );
   // Motif things will be initialized (Only main view should do this)
   //
   err = view->MVCInitializeWindowingSystem();
   if (err) return(err);
   // Create the main view
   //
   err = view->MVCCreate();
   if (err) return(err);
   // instantiate confirmation dialog
   //
   confirmationDialog = new kuiConfirmationDialogControllerC_c( this );
   err = confirmationDialog->MVCCreate( view->
   MVCGetParentCandidateQM() );
   if (err) return err;
   // Instantiate sub controllers and create them
   //
   selection = new abcSelectionController_c( this );
   err = selection->MVCCreate( view->MVCGetParentCandidateQM() );
   if (err) return(err);
   return OK;
}
/****************************************************
*
* <PROTECTED> FUNCTION: mvcViewBase_c
* abcDefaultMainController_c::MVCGetMainView()
****************************************************
*
*
* Returns the main view
*
****************************************************
*/
mvcMainViewBase_c
*abcDefaultMainController_c::MVCGetMainView()
{
```

```
   return(view);
}
/****************************************************
*
* <PUBLIC> FUNCTION: void abcDefaultMainController_c::
AbcWMCloseWanted()
****************************************************
*
*
* Shuts the application down
*
****************************************************
*/
void abcDefaultMainController_c::AbcWMCloseWanted()
{
   if ( view->MVCIsIconifiedQM() )
   {
     view->MVCUnIconifyFM();
   }
   confirmationDialog->AskConfirmation( (char *) closeText);
```

```
}
/****************************************************************
*
* <PUBLIC> FUNCTION: void abcDefaultMainController_c::
KuiActionConfirmed()
****************************************************************
*
*
* Shuts the application down
*
****************************************************************
*/
void abcDefaultMainController_c::KuiActionConfirmed()
{
   abcProgram->MVCShutdown();
}
/****************************************************************
*

* <PUBLIC> FUNCTION: void
abcDefaultMainController_c::KuiActionNotConfirmed()
****************************************************************
*
*
* Shuts the application down
*
```

```
-continued

****************************************************************
*/
void abcDefaultMainController_c::KuiActionNotConfirmed()
{
   // does't need any actions
}
```

A skeleton main controller class will be described next. The header file "abccontmainmx.h" of the skeleton class is as follows (cf. the corresponding template file shown in Appendix 1).

```
/****************************************************************
*
* *
* * $RCSfile$
* *
*
****************************************************************
* *
* * $Author$
* *
* * Copyright (c) Nokia Telecommunications 1991–1995
*
****************************************************************
* *
* * Application Framework generated file
* * This is a header file for skeleton main controller class.
* * Complete the required functionality in this file.
* * RUNGOXMX version: @(#) Version 1.9 (t8mcl)
* *
*
****************************************************************
* *
* * $Log$
*
****************************************************************
```

```
#ifndef ABCMAINCONTROLLER_H
define ABCMAINCONTROLLER_H
/* MODULE IDENTIFICATION
************************************************/
static char abccontmainmx_rcsid[ ] = "$Id$";
#include "abccontmadfmx.h"
class abcMainController_c
: public abcDefaultMainController_c
{
public:
    abcMainController_c(abcDefaultProgram_c *abcPrg);
    ~abcMainController_c( );
    virtual errAtom_c *MVCCreate( );
    // AF_TOKEN_START#public_methods#
    // AFTool generated abstract partner methods.
    // Don't add your own code between AF_TOKENS
    // AF_TOKEN_END#public_methods#
    // AF_TOKEN_START#abs_partner_methods#
    // AFTool generated abstract partner methods.
    // Don't add your own code between AF_TOKENS
void AbcUpdateButtonActivated (name_t name, intID_t identifier, float maxPower,
float minPower);
void AbcSelectButtonActivated( );
    void BuiExitWanted( );         // inherited from a gui component
    void BuiPrintSetupWanted( );   // inherited from a gui component
    void BuiPrintWanted( );        // inherited from a gui component
    void AbcControllerSelected(intID_t identifier);
    // AF_TOKEN_END#abs_partner_methods#
protected:
```

```
private:
    abcMainController_c( const acMainController_c & );
    abcMainController_c operator=( const abcMainController_c & ) const;
};
#endif
/* ABCMAINCONTROLLER_H */
```

The implementation file "abccontmainmax.cc" of the skeleton main controller class in turn is as follows.

```
/**********************************************************
*
* *
* * $RCSfile$
* *
*
**********************************************************
* *
* * $Author$
* *
* * Copyright © Nokia Telecommunications 1991–1995
*
**********************************************************
* *
* * Application Framework generated file
* * This is a implementation file for skeleton main controller class.
```

-continued

```
* * Complete the required functionality in this file.
* * RUNGOXMX version: @(#) Version 1.9 (t8mcl)
* *
*
**********************************************************
* *
* * $Log$
*
**********************************************************
// MODULE IDENTIFICATION
*******************************************
static char resid[ ] = "$Id$";
```

```
#include <wmtracmx.h>
// trace object
extern wmtTrace_c *trace;
#include "abccontmainmx.h" // Header of this main controller
#include "abcmainprdfmx.h" // Header of the program module
/************************************************************************
*
* <PUBLIC> FUNCTION: abcMainController_c::abcMainController_c( )
************************************************************************
*
*
* Constructor.
*
************************************************************************
*/
abcMainController_c::abcMainController_c
(
abcDefaultProgram_c *abcPrg
)
: abcDefaultMainController_c(abcPrg)
{
}
/************************************************************************
*
* <PUBLIC> FUNCTION: abcMainController_c::~abcMainController_c( )
************************************************************************
*
*
* Destructor
*
************************************************************************
*/
abcMainController_c::~abcMainController_c( )
{

}
/************************************************************************
*
* <PUBLIC> FUNCTION: abcMainController_c::MVCCreate( )
************************************************************************
*
*
* Controller creation
*
```

-continued

```
*/
errAtom_c *abcMainController_c::MVCCreate( )
{
    errAtom_c *err = abcDefaultMainController_c::MVCCreate( );
    // add actions needed in conroller construction here
    return err;
}
/**************************************************************
*
* <PUBLIC> FUNCTION: void abcMainController_c:: AbcUpdateButtonActivated
(name_t name, intID_t identifier, float maxPower, float minPower)
**************************************************************
*
* Implementation of an abstract partner method
*
*
**************************************************************
*/
// AF_TOKEN#abc2# - Don't remove this token
void abcMainController_c::AbcUpdateButtonActivated (name_t name, intID_t
identifier, float maxPower, float minPower)
{
```

```
    AF_TRACE("void abcMainController_c::AbcUpdateButtonActivated(name_t name,
intID_t identifier, float maxPower, float minPower)");
    // Add your own code here.
}
/**************************************************************
*
* <PUBLIC> FUNCTION: void abcMainController_c::AbcSelectButtonActivated( )
**************************************************************
*
* Implementation of an abstract partner method
*
**************************************************************
*/
// AF_TOKEN#abc3# - Don't remove this token
void abcMainController_c::AbcSelectButtonActivated( )
{
    AF_TRACE("void abcMainController_c::AbcSelectButtonActivated( )");
    // Add your own code here.
}
/**************************************************************
*
* <PUBLIC> FUNCTION: void abcMainController_c::BuiExitWanted( )
**************************************************************
*
* Implementation of an abstract partner method
*
*
**************************************************************
*/
// AF_TOKEN#bui12# - Don't remove this token
void abcMainController_c::BuiExitWanted( )
{
    AF_TRACE("void abcMainController_c::BuiExitWanted( )");
    // Add your own code here.
```

```
}
/**************************************************************
*
* <PUBLIC> FUNCTION: void abcMainController_c::BuiPrintSetupWanted( )
**************************************************************
*
* Implementation of an abstract partner method
*
*
**************************************************************
*/
```

-continued

```
// AF_TOKEN#bui13# - Don't remove this token
void abcMainController_c::BuiPrintSetupWanted( )
{
    AF_TRACE("void abcMainController_c::BuiPrintSetupWanted( )");
    // Add your own code here.
}
/************************************************************************
*
* <PUBLIC> FUNCTION: void abcMainController_c::BuiPrintWanted( )
*************************************************************************
*
* Implementation of an abstract partner method
*
*
*************************************************************************
*/
// AF_TOKEN#bui14# - Don't remove this token
void abcMainController_c::BuiPrintWanted( )
{
    AF_TRACE("void abcMainController_c::BuiPrintWanted( )");
    // Add your own code here.
}
/************************************************************************
*
```

```
* <PUBLIC> FUNCTION:void abcMainController_c:: AbcControllerSelected(intID_t
identifier)
*************************************************************************
**
* Implementation of an abstract partner method
*
*
*************************************************************************
*/
// AF_TOKEN#abc7# - Don't remove this token
void abcMainController_c::AbcControllerSelected(intID_t identifier)
{
    AF_TRACE("void abcMainController_c:: AbcControllerSelected(intID_t
identifier)");
    // Add your own code here.
}
```

The designer implements the functionality required by the application by adding a sufficient amount of code to the skeleton classes. The user interface is supplemented for example with the aforementioned X-Designer™ tool by using generated descriptions of the visual view classes having the format of the X-Designer™.

The classes of the model part, BaseStation_c and BaseStationGroup_c (cf. FIG. 4), have already been implemented in the class library of the model part, wherefore they do not have to be carried out in connection with the present application.

As it is apparent from the above, the code generator creates default and skeleton classes automatically by modifying the corresponding template files on the basis of the data provided in the description file of the application.

It has been described above in detail how the application framework is generated. This example thus described a situation where an application is created for the first time. A situation where changes must be made to the application framework will be examined next. The example relates to a situation where the operator using the network management system requests for the addition of a new property, a so-called priority service, to the base station controller. In the network of this operator the clients are divided into two classes: those who have a gold card and those who have a silver card. If all the channels are being used during heavy traffic and a user with a gold card makes a call, one of the users of a silver card is removed from the channel. This service requires a new parameter indicating whether the priority service is being used.

FIG. 7 illustrates the change required in the user interface. As FIGS. 3a and 7 show, the window will be provided with a new parameter "priority mode" which may have two values (yes or no).

Figure 8:
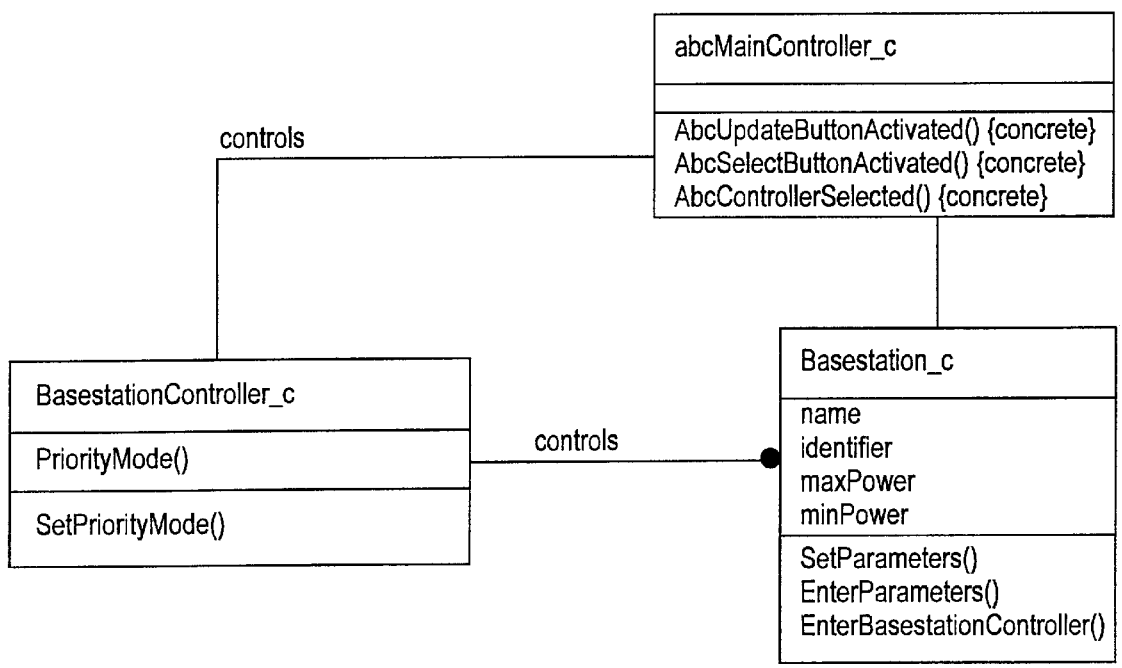
FIG. 8 shows the change to be made to the object model.

FIG. 8 illustrates the change required in the object diagram that was shown earlier in FIG. 4. FIG. 8 only shows the part of the diagram that is changed. The diagram will thus be provided with a new class "BaseStationController_c" the attribute of which is "priorityMode" and the method is "SetPriorityMode".

It is also noted in this connection that the updating of the radio network parameters in a base station takes a long time. Therefore the application must be provided with a so-called working dialog that indicates to the user that the operation is still in process. FIG. 9 illustrates a working dialog window.

The addition of the priority service will be described first. In order to implement this change (the addition of a new parameter to the methods "ShowParametersFM" and "AbcUpdateButtonActivated" that the change concerns), the new boolean_t parameter "priorityMode" is added to the declaration of the methods in the description file 12 of the application. The frame below shows a part of the description file shown above. The frame shows in boldface the additions that are made to the description file when the priority service is added.

```
# ...
    (public_method "#abc1# void ShowParametersFM(name_t name,
intID_t identifier,
            float maxPower, float minPower,
            boolean_t priorityMode)"
```

```
)
    (abs_partner" "
        (abs_partner_method
            "#abc2# void::AbcUpdateButtonActivated(name_t name, intID_t
identifier,
            float maxPower, float minPower
            boolean_t priorityMode)"
        )
# ...
```

The identifiers #abc1# and #abc2# indicate that logically the same methods are still used (i.e. the implementation written for the methods remains the same) even though the declaration changes.

When the required changes have been made to the description file, the code is regenerated by means of the code generator. The code generator then updates in the header files of the skeleton main view and main controller classes the parts that are to be regenerated. The parts to be regenerated are indicated with the character strings AF_TOKEN_END and AF_TOKEN_START and they can therefore be updated without any other parts in the file being changed (AF_TOKEN_START is the initial character and AF_TOKEN_END is the stop character for the part to be regenerated.)

Before the change, the shared header file of the skeleton main view and abstract partner classes is as follows:

```
class abcMainViewAbsVP_c
: public abcDefaultMainViewAbsVP_c
{
public:
    // AF_TOKEN_START#abs_partner_methods#
    // AFTool generated abstract partner methods.
    // Don't add your own code between AF_TOKENS
    virtual void AbcUpdateButtonActivated (name_t name, intID_t
identifier, float maxPower, minPower) = 0;
    virtual void AbcSelectButtonActivated() = 0;
    // AF_TOKEN_END#abs_partner_methods#
};

class abcMainView_c
: public abcDefaultMainView_c
```

-continued

```
{
public:
    // ...
    // AF_TOKEN_START#public_methods#
    // AFTool generated abstract partner methods.
    // Don't add your own code between AF_TOKENS
    virtual void ShowParametersFM (name_t name, intID_t identifier,
float maxPower, minPower) = 0;
    virtual void AbcSelectButtonActivated() = 0;
    // AF_TOKEN_END#public_methods#
};
```

After the change, the situation is as follows (the added parts are shown in boldface).

```
class abcMainViewAbsVP_c
: public abcDefaultMainViewAbsVP_c
{
public:
    // AF_TOKEN_START#abs_partner_methods#
    // AFTool generated abstract partner methods.
    // Don't add your own code between AF_TOKENS
    virtual void AbcUpdateButtonActivated (name_t name, intID_t
identifier, float maxPower, float minPower, boolean_t
priorityMode) = 0;
    virtual void AbcSelectButtonActivated() = 0;
    // AF_TOKEN_END#abs_partner_methods#
};
class abcMainView_c
: public abcDefaultMainView_c
{
public:
    // ...
    // AF_TOKEN_START#public_methods#
    // AFTool generated abstract partner methods.

// Don't add your own code between AF_TOKENS
    virtual void ShowParametersFM (name_t name, intID_t identifier,
float maxPower, float minPower, boolean_t priorityMode)= 0;
    virtual void AbcSelectButtonActivated() = 0;
    // AF_TOKEN_END#public_methods#
};
```

The above-described header file of the skeleton main controller class in turn is as follows after the change (only a part of the file is shown, the changed parts are in boldface).

```
class abcMainController_c
: public abcDefaultMainController_c
{
public:
    // ...
    // AF_TOKEN_START#abs_partner_methods#
    // AFTool generated abstract partner methods.
    // Don't add your own code between AF_TOKENS
    void AbcUpdateButtonActivated (name_t name, intID_t identifier,
float maxPower, float minPower, boolean_t priorityMode);
    void AbcSelectButtonActivated();
    void BuiExitWanted();         // inherited from a gui component
    void BuiPrintSetupWanted();   // inherited from a gui component
    void BuiPrintWanted();        // inherited from a gui component
    void AbcControllerSelected (intID_t identifier);
    // AF_TOKEN_END#abs_partner_methods#
    // ...
};
```

Adding the aforementioned parameter (boolean_t priorityMode) automatically to the declaration of the "void AbcUpdateButtonActivated( )" method in the declarations of the skeleton main controller class and the skeleton main view abstract partner class illustrates how easy it is to add new properties to the application framework with the arrangement according to the invention. The aforementioned addition was carried out by making the addition to the description file and by regenerating the code by the code generator. It should be noted that also the default classes are regenerated in this connection, but in this example no changes occur in the default classes (since no changes concerning them were made to the description file).

The partner method to be changed in the implementation file of the skeleton main controller class is identified with the identifier #abc2# (provided in the description file) following AF_TOKEN. The change takes place in the following manner: the code generator reads the file and eliminates the characters beginning from the line following AF_TOKEN to the first "{" sign and writes in that place the new declaration of the partner method (on the basis of the new declaration of the description file). The code generator then goes on scanning the file until it sees the first AF_TRACE character string. The code generator replaces the characters in the brackets following AF_TRACE with a new partner method declaration. The code generator then scans the file backwards until it sees the character string <PUBLIC> FUNCTION:. The code generator eliminates the characters following <PUBLIC> FUNCTION: until the next line feed character and writes in their place the new partner method declaration (N.B. Even though in the code example given below the declaration of the abstract partner method continues on the following line, the line feed character only comes at the end of the method declaration.)

```
/***********************************************
**
* <PUBLIC> FUNCTION: void abcMainController_c::
AbcUpdateButtonActivated ( name_t name, intID_t identifier,
float maxPower, float minPower, boolean_t priorityMode)
***********************************************
**
* Implementation of an abstract partner method
*
*
***********************************************
**/
// AF_TOKEN#abc2#
```

```
void abcMainController_c:: AbcUpdateButtonActivated (name_t name,
intID_t identifier, float maxPower, float minPower, boolean_t
priorityMode)
{
    AF_TRACE("void abcMainController_c:: AbcUpdateButtonActivated
( name_t name, intID_t identifier, float maXPower, float minPower,
boolean_t
priorityMode)");
    // Add your own code here.
    // the programmer's own code may be provided here
}
```

The above-described changing of the method declaration (i.e. adding the parameter to the declaration) is an example of how a connection is maintained between a code generated by the code generator and a code written by the programmer. In this example, the character string "abc2" is an identifier which corresponds to the method (UpdateButtonActivated) and by means of which the connection is maintained. The programmer had earlier written a code manually in the frame generated for this method in order to update the parameters to the base station controller.

The method "ShowParametersFM( )" is changed in the implementation file "abcviewmainmx.cc" of the main view class in the same manner as the above-described abstract partner method in the implementation file of the main controller. The identifer corresponding to this method is "abc1", as the description file of the application shows. By means of these identifiers given in the description file, it is known even after the changes made to the description file and the regeneration of the skeleton classes to which part of the skeleton class each change corresponds.

The addition of the priority service to the application has been described above. In the following, the addition of the aforementioned working dialog will be described.

In order to carry out this change, the header files of the main controller classes must be supplemented with the header file of the working dialog component, the abstract partner class of the working dialog must be inherited to the main controller, the abstract partner methods of the working dialog must be declared, and a variable must be declared as a pointer to the working dialog object. A pointer must be initialized in the implementation file of the main controller class to the working dialog, a new working dialog object instance must be created, the working dialog object dialog must be deleted and the abstract partner methods of the working dialog must be implemented.

The change is carried out in practice by writing the line:

(service "working_dialog")

to the definition part of the main controller in the description file (reference numeral 12, FIG. 1) of the application and by regenerating the application framework. In the following, the changes caused in the regeneration by a change made to the description file are shown.

The code generator regenerates the header file "abccontmadfmx.h" of the default class to which header file the header file of the working dialog component has been added, the abstract partner class of the working dialog has been inherited and a link to the working dialog object has been added to the protected part of the class (these changes are shown in boldface):

```
// for working dialog
#include "kuiccwrkdlgmx.h"
// . . .
class abcDefaultMainController_c
: public mvcMainControllerBase_c,
    public kuiConfirmationDialogControllerAbsCP_c,
    public abcMainViewAbsVP_c,
    public abcSelectionControllerAbsCP_c,
    public kuiWorkingDialogControllerAbsCP_c
```

```
{
    // . . .
protected:
    // . . .
        // working dialog
        kuiWorkingDialogControllerC_c *workingDialog;
};
```

The code generator also regenerates the implementation file "abccontmadfmx.cc" of the default class, wherein 1. the working dialog pointer is initialized:

```
abcDefaultMainController_c::abcDefaultMainController_c
(
    abcDefaultProgram_c *abcPrg
)
{
    // . . .
    workingDialog = 0;
}
```

2. the working dialog is deleted:

```
abcDefaultMainController_c::~abcDefaultMainController_c()
{
    // . . .
    delete workingDialog;
    workingDialog = 0;
}
```

, and
3. a new working dialog object instance is created:

```
errAtom_c
*abcDefaultMainController_c::MVCCreate()
{
    // . . .
    // create new working dialog
    workingDialog = new kuiWorkingDialogControllerC_c( this );
    err = workingDialog->MVCCreate( view->MVCGetParentCandidateQM() );
    if (err) return(err);
}
```

Abstract partner declarations are regenerated in the header file "abccontmainmx.h" of the skeleton main controller class, the abstract partner method of the working dialog being included therein:

```
class abcMainController_c
: public abcDefaultMainController_c
{
public:
    // . . .
    // AF_TOKEN_START#abs_partner_methods#
    // AF_Tool generated abstract partner methods.
    // Don't add your own code between AF_TOKENS
    void AbcUpdateButtonActivated (name_t name, intID_t identifier, float maxPower,
float minPower, boolean_t priorityMode);
    void AbcSelectButtonActivated();
    void BuiExitWanted();              // inherited from a gui component
    void BuiPrintSetupWanted();        // inherited from a gui component
    void BuiPrintWanted();             // inherited from a gui component
    void AbcControllerSelected (intID_t identifier);
    virtual void KuiCancelWanted();    // for working dialog
    // AF_TOKEN_END#abs_partner_methods#
    // . . .
}
```

The code generator identifies the part to be regenerated by means of AF_TOKEN_START and AF_TOKEN_END and it can therefore change a part of the file so that the rest of the code remains the same.

A frame is generated in the implementation file "abccontmainmx.cc" of the skeleton main controller class for the implementation of the abstract partner method:

```
/******************************************************************
* <PUBLIC> FUNCTION: void abcMainController_c::KuiCancelWanted()
*******************************************************************
**
* Implementation of an abstract partner method
*
*
******************************************************************/
// AF_TOKEN#kui3# - don't remove this token
void abcMainController_c: :KuiCancelWanted()
{
    AF_TRACE("void abcMainController_c::KuiCancelWanted()");
    // Add your own code here.
}
```

In this frame of the abstract partner method, the designer implements a functionality that is to follow the pressing of the Cancel button of the working dialog.

The designer activates (shows on the display) the working dialog by writing the request workingDialog→ShowLongDelay(MESSAGE_TEXT) before the part of the code that begins the time-consuming operation, for example:

```
void abcMainController_c:: AbcUpdateButtonActivated (name_t name,
intID_t identifier, float maxPower, float minPower,
boolean_t priorityMode)
{
   AF_TRACE("void abcMainController_c:: AbcUpdateButtonActivated
(name_t name, intID_t identifier, float maxPower, float minPower,
boolean_t priorityMode)");
    // Add your own code here.
    // a time-consuming operation begins
    workingDialog->ShowLongDelay(MESSAGE_TEXT);
basestation->SetParameters(maxPower, minPower, priorityMode)
}
```

The above example (the addition of the working dialog) shows how easy it is to add a new property to the application framework. The change was implemented by adding one line to the description file and by regenerating the application framework on the basis of the changed description file. The abstraction level of the application also remains high since only the methods "KuiCancelWantedo" and "ShowLongDelay( )" are shown in the application part visible to the designer from the working dialog service. The more complicated code for adding the working dialog object to the application was generated (automatically) to a default class that is not visible to the designer.

Even though the invention is described above with reference to the examples according to the accompanying drawings, it is clear that the invention is not restricted thereto, but it can be modified within the scope of the inventive idea disclosed above and in the appended claims. Even though an object-based application is described above, it is in principle possible to use a similar arrangement also in other types of arrangements. Similarly, the method can also be used for producing services in other systems besides the network management systems, even though the latter systems constitute an advantageous environment of implementation for the reasons given at the beginning. The means according to the invention can form a part of such a system providing services or the method can be carried out separately from the system and a finished application can be transferred thereafter to the system.

43

Appendix 1 - examples of template files

Template for header file of default main controller class.

```
/***********************************************************************
**
**
**    $RCSfile$
**
*
***********************************************************************
**
**    $Author$
**
**    Copyright (c) Nokia Telecommunications 1991 - 1995
*
***********************************************************************
**
**    Template file for Application Framework generated class
**
*
***********************************************************************
**
**    $Log$
*
**********************************************************************/
BODY_START ifndef FFTDEFAULTMAINTCONTROLLER_H
define FFTDEFAULTMAINTCONTROLLER_H

/* MODULE IDENTIFICATION
************************************************/ static char fftcontmadfmx_rcsid[] = "$Id$" ;

include <stdio.h>
#include <stdlib.h>
#include <weratomx.h>           // Errors
#include <kuicocfmdlgmx.h>      // controller confirmation dialog
include "MAINVIEW_H"           // Main View and abstract view partner // header files of sub controllers
INC_SUB_CONTROLLERS class fftDefaultProgram_c;
```

44

```
     RENAMER_CLASSES 5  class fftDefaultMainController_c
     : public mvcMainControllerBase_c,
       public kuiConfirmationDialogControllerAbsCP_c,
       public fftMainViewAbsVP_cINHERIT_ABS
     {
 10  public:
         fftDefaultMainController_c(fftDefaultProgram_c *fftPrg);
         virtual ~fftDefaultMainController_c();
         virtual errAtom_c *MVCCreate();

15      // defived from abs. view partner
         virtual void FftWMCloseWanted();

// confirmation controller abstract partner
         // methods
 20      virtual void KuiActionConfirmed();
         virtual void KuiActionNotConfirmed();

25  protected:
         mvcMainViewBase_c *MVCGetMainView();

MAINVIEW_C         *view;
         fftDefaultProgram_c      *fftProgram;
 30
         // confirmation dialog
         kuiConfirmationDialogControllerC_c *confirmationDialog;

SUB_CONT_DECLARATIONS
 35
     private:

fftDefaultMainController_c( const fftDefaultMainController_c & );
         fftDefaultMainController_c operator=
 40          ( const fftDefaultMainController_c & ) const;
     };

#endif
 45  /* FFTDEFAULTMAINCONTROLLER_H */
```

45

Template for implementation file of default main controller class.

```
/***********************************************************************
**
**
**   $RCSfile$
**
*
***********************************************************************
**
**   $Author$
**
**   Copyright (c) Nokia Telecommunications 1991 - 1995
*
***********************************************************************
**
**   Template file for Application Framework generated class
**
*
***********************************************************************
**
**   $Log$
*
***********************************************************************/
BODY_START

// MODULE IDENTIFICATION
//********************************************* static char rcsid[] = "$Id$" ;

include "fftcontmadfmx.h"   // Header of this main controller
include "fftmainprogmx.h"   // Header of program module // message text for WM close confirmation dialog
const char *closeText =
"This will close the application.\nDo you want to proceed?";

/***********************************************************************
**
 * <PUBLIC> FUNCTION: fftDefaultMainController_c::fftDefaultMainController_c()
```

```
/********************************************************************
**
*
* Constructor.
*
********************************************************************
**/
fftDefaultMainController_c::fftDefaultMainController_c
(
  fftDefaultProgram_c *fftPrg
)
{
  fftProgram = fftPrg;
  view = 0;

confirmationDialog = 0;

SUB_CONTROLLERS_TO_NULL

}

/********************************************************************
**
* <PUBLIC> FUNCTION:
fftDefaultMainController_c::~fftDefaultMainController_c()

********************************************************************
**
*
* Destructor
*
********************************************************************
**/
fftDefaultMainController_c::~fftDefaultMainController_c()
{
  view->MVCHideFM();
  delete view;
  view = 0;

delete confirmationDialog;

DELETE_SUB_CONTROLLERS
SUB_CONTROLLERS_TO_NULL
```

```
}
/***********************************************************************
**
* <PRIVATE> FUNCTION: errAtom_c *fftDefaultMainController_c::MVCCreate()
***********************************************************************
**
*
* Controller creation
*
***********************************************************************
**/
errAtom_c
*fftDefaultMainController_c::MVCCreate()
{
    errAtom_c *err = 0;

// Instantiate The MainWindow
    //
    view = new MAINVIEW_C( this );

// Motif things will be initialized (Only main view should do this)
    //
    err = view->MVCInitializeWindowingSystem();
    if (err) return(err);

// Create the main view
    //
    err = view->MVCCreate();
    if (err) return(err);

// instantiate confirmation dialog
    confirmationDialog = new kuiConfirmationDialogControllerC_c( this );
    err = confirmationDialog->MVCCreate( view->MVCGetParentCandidateQM() );
    if (err) return err;

// Instantiate sub controllers and create them
    //
    CREATE_SUB_CONTROLLERS return OK;
}
```

48

```
/**********************************************************************
**
* <PROTECTED> FUNCTION: mvcViewBase_c
*fftDefaultMainController_c::MVCGetMainView()
**********************************************************************
**
*
* Returns the main view
*

**********************************************************************
**/
mvcMainViewBase_c
*fftDefaultMainController_c::MVCGetMainView()
{
   return(view);
}

/**********************************************************************
**
 * <PUBLIC> FUNCTION: void fftDefaultMainController_c::FftWMCloseWanted()

**********************************************************************
**
*
* Shuts the application down
*

**********************************************************************
**/ void fftDefaultMainController_c::FftWMCloseWanted()
{
   if ( view->MVCIsIconifiedQM() )
   {
      view->MVCUnIconifyFM();
   } confirmationDialog->AskConfirmation( (char *) closeText );
}

/**********************************************************************
**
* <PUBLIC> FUNCTION: void fftDefaultMainController_c::KuiActionConfirmed()
```

```
/*********************************************************************
**
*
*  Shuts the application down
*
*********************************************************************
**/
void fftDefaultMainController_c::KuiActionConfirmed()
{
   fftProgram->MVCShutdown();
}

/*********************************************************************
**
*  <PUBLIC> FUNCTION: void
fftDefaultMainController_c::KuiActionNotConfirmed()

*********************************************************************
**
*
*  Shuts the application down
*
*********************************************************************
**/
void fftDefaultMainController_c::KuiActionNotConfirmed()
{
   // does't need any actions
}
```

Template for header file of skeleton main controller class.

```
/*********************************************************************
**
* *
* *    $RCSfile$
* *
*
*********************************************************************
* *
* *    $Author$
* *
* *    Copyright (c) Nokia Telecommunications 1991 - 1995
```

```
*
***********************************************************************
* *
* *    Template file for Application Framework generated class
* *
*
***********************************************************************
* *
* *    $Log$
*
***********************************************************************/
BODY_START ifndef ABCMAINCONTROLLER_H
define ABCMAINCONTROLLER_H

/* MODULE IDENTIFICATION
**************************************************/ static char abccontmainmx_rcsid[] = "$Id$" ;

include "abccontmadfmx.h"

class abcMainController_c
: public abcDefaultMainController_c
{
public:

abcMainController_c(abcDefaultProgram_c *abcPrg);
    ~abcMainController_c();

virtual errAtom_c *MVCCreate();

// AF_TOKEN_START#public_methods#
    // AFTool generated abstract partner methods.
    // Don't add your own code between AF_TOKENS
    // AF_TOKEN_END#public_methods#

// AF_TOKEN_START#abs_partner_methods#
    // AFTool generated abstract partner methods.
    // Don't add your own code between AF_TOKENS
    // AF_TOKEN_END#abs_partner_methods# protected:
```

```
private:

abcMainController_c( const abcMainController_c & );
   abcMainController_c operator=( const abcMainController_c & ) const;
};

#endif
/* ABCMAINCONTROLLER_H */
```

Template for implementation file of skeleton main controller class.
```
/************************************************************
**
**
**   $RCSfile$
**
*
*************************************************************
**
**   $Author$
**
**   Copyright (c) Nokia Telecommunications 1991 - 1995
*
*************************************************************
**
**   Template file for Application Framework generated class
**
*
*************************************************************
**
**   $Log$
*
*************************************************************/
BODY_START

// MODULE IDENTIFICATION
//********************************************* static char rcsid[] = "$Id$" ;

TRACE_DECLARATION include "fftcontmainmx.h"  // Header of this main controller
include "fftmainprdfmx.h"  // Header of the program module
```

52

```
/**********************************************************************
**
* <PUBLIC> FUNCTION: fftMainController_c::fftMainController_c()

***********************************************************************
**
*
* Constructor.
*

***********************************************************************
**/
fftMainController_c::fftMainController_c
(
  fftDefaultProgram_c *fftPrg
)
: fftDefaultMainController_c(fftPrg)
{

}

/**********************************************************************
**
* <PUBLIC> FUNCTION: fftMainController_c::~fftMainController_c()

***********************************************************************
**
*
* Destructor
*

***********************************************************************
**/
fftMainController_c::~fftMainController_c()
{

}

/**********************************************************************
**
* <PUBLIC> FUNCTION: fftMainController_c::MVCCreate()
```

```
/******************************************************************
**
*
* Controller creation
*

******************************************************************
**/
errAtom_c *fftMainController_c::MVCCreate()
{
    errAtom_c *err = fftDefaultMainController_c::MVCCreate();

// add actions needed in conroller construction here return err;
}

ABS_STUBS
```

Appendix 2 - The syntax of the description file of the code generator

The following table shows the syntax of the description file of the code generator. The symbols printed in italics are metasymbols. The metasymbols are not shown as such in the description file, but their purpose is only to show the syntax in a more easily readable form. The terminal symbols are shown in quotation marks. The terminal symbols are shown in the description file in the same form as in the table below. Symbols that are shown in brackets "[","]" are optional. Symbols shown in braces "{","}" may be repeated a zero or more times. The comment lines begin with the sign #.

The design of the structure of the description file was restricted by the general structure of the configuration files that is of the form:

*ConfFile* ::= "(" *item* ")"
*item* ::= *token value* {"(" *item* ")"} wherein *token* is any character string containing alphanumeric characters and *value* is any character string in quotation marks.

| | |
|---|---|
| *ConfFile* ::= | "("<br>"application" *value*<br>*PrefixDeclaration*<br>*FamilyIdDeclaration*<br>*TypeDeclaration*<br>[*SkelTestDeclaration*]<br>{*ServDeclaration*}<br>*MainContDeclaration*<br>")" |
| *PrefixDeclaration* ::= | "(" "program_block_prefix" *value* ")" |
| *FamilyIdDeclaration* ::= | "(" "family_id" *value* ")" |
| *SkelTestDeclaration* ::= | "(" "skeleton_test" *value* ")" |
| *ServDeclaration* ::= | "(" service *value* ")" |

```
MainContDeclaration ::=      "("
                             "main_controller" value
                             {PublicMethodDeclaration}
                             [ViewDeclaration]
                             {ServDeclaration}
                             {SubContDeclaration}
                             ")"
ViewDeclaration ::=          "("
                             "view" value
                             {PublicMethodDeclaration}
                             [FileDeclaration]
                             TypeDeclaration
                             {AbsPartnerDeclaration}
                             ")"
SubContDeclaration ::=       "("
                             "sub_controller" value
                             {InstanceDeclaration}
                             {PublicMethodDeclaration}
                             [FileDeclaration]
                             [ViewDeclaration]
                             [AbsPartnerDeclaration]
                             {ServDeclaration}
                             {SubContDeclaration}
                             ")"
AbsPartnerDeclaration ::=    "("
                             "abs_partner" value
                             {AbsMethodDeclaration}
                             ")"
AbsMethodDeclaration ::=     "(" "abs_partner_method" value ")"
PublicMethodDeclaration      "(" "public_method" value ")"
  ::=
InstanceDeclaration ::=      "(" "instance" value ")"
FileDeclaration ::=          "(" "file" value ")"
Typedeclaration ::=          "(" "type" value ")"
value ::=                    """{any character expect """}"""
```

The following example clarifies the semantics of the configuration file.

```
# Application name, must comply with the form rule.
( application "fooprgmx"

# Prefix for application classes and file names.
        ( program_block_prefix "foo" )

# Application identifier. Used as an identifier with which the signalling service
        # identifies the process
        ( family_id       "FOOPRG" )

# Application type. "UI" for user interface, applications,
        # "BG" for background applications
        ( type            "UI" )

# Indicates that the method frames generated by the application are
        # to be provided with the program AF_TRACE service that prints on
        # the terminal information about implementing the method (skeleton_test "yes")

List of services employed by the application.
        ( service         "wne_manager" )
        ( service         "process_control" )

# Main controller definition. The name of the main controller class
        # is generated automatically to correspond to the form rule
        (main_controller ""

# Main controller definition. The name of the main view class
                # is generated automatically to correspond to the form rule.
                ( view ""
                        # Main view type. Determines the GUI component from
                        # which the main view visual    # class is inherited.
                        (type "basic_application_base")

# public interface definition
                        ( public_method "void ShowThisFM(char *txt)")
                        ( public_method "void ShowThatFM(int valur)")

# Main view abstract partner definition. The name of the
                        # abstract partner class is generated automatically
                        # to correspond to the form rule.
                        ( abs_partner ""

# Declaration of abstract partner methods. Methods inherited
                                # from the # GUI component do not have to be # declared.
```

```
                    ( abs_partner_method "void ::FooIsDone()" )
                    ( abs_partner_method "void ::FooSomethingWanted()" )
                )
            )
            # list of services to be used in the main controller
            (service "working_dialog")

# Subcontroller definition. The subcontroller name is generated from the
            # given character string to correspond to the form rule. E.g. Sub1 =>
            # fooSub1Controller_c
            ( sub_controller "sub1"

# If there are several instances of the subcontroller, they must be
                    # separated from one another with different instance names. If there
                    # is only one instance, it can be left without definition, and the
                    # character string given in the subcontroller definition is used as the
                    # instance name
                    (instance "donald")
                    (instance "mickey")

# Character string used for generating the subcontroller file names
                    # can be left out, in which case the character string given in the
                    # subcontroller definition is used.
                    (file "subcon" )

# public interface definition
                    ( public_method "void Action()")
                    ( public_method "int OtherAction()")

# Subview definition. If no subview name is given the controller
                    # name is used for generating the class name.
                    ( view "sub1"

# Subview type. Defines the components from which the
                            # subview visual class is inherited.
                            (type "basic_yes_no_help_dialog"

# Subview abstract partner class definition
                                    ( abs_partner ""
                                        ( abs_partner_method "
                                            void::FooSubViewTellsSomething()"
                                        )
                                    )
                            )
                    )

# Subcontroller abstract partner class definition.
```

58

```
         ( abs_partner ""
             ( abs_partner_method "void ::FooSubContWantsThis()" )
             ( abs_partner_method "void ::FooSubContWantsThat()" )
         )
5        ( sub_controller "sub2"
             ( view ""
                  (type "bui_ok_help_dialog")
             )
         )
10       )

( sub_controller "sub3"
             ( view ""
                  (type "bui_ok_cancel_help_dialog")
15       )
         )
     )
         )
```

What is claimed is:

1. A method for producing application-specific computer-controlled services for a user, the method comprising:

forming a description file describing an application for an intended service, the description file formed with terms of an application architecture used;

generating automatically an application-specific program code from which an application-specific computer program is formed by using software generating means and by following the terms of the application architecture used; and running said application-specific computer program in order to provide the user with said intended service;

wherein the forming of the application-specific computer program further comprises dividing the application-specific computer program into different groups in such a way that a first group (A) is formed only of such a program code that remains the same regardless of the application; and a second and a third group are provided with a program code produced by said software generating means in such a way that (a) the second group (B) only includes a program code produced by said software generating means and (b) the third group (C) contains such a program code produced with said software generating means that a designer is intended to change after the generation; and informing the software generating means whether a program code to be generated is produced for the second or for the third group.

2. The method according to claim 1, wherein the application is object-based and that the properties of the first group are inherited to the second group and the properties of the second group to the third group.

3. The method according to claim 2, wherein the input data provided to the generating means is divided into two parts in such a way that one corresponds to said second group and the other one corresponds to said third group.

4. The method according to claim 3, wherein said parts consist of template files, and that the generation is performed by supplementing the template files on the basis of the application description.

5. The method according to claim 1, wherein inside the third group the part to be modified by the designer is separated from the rest of the group with character strings reserved for this purpose.

6. The method according to claim 1, wherein in the description of an individual identifier is given to the information that is supplemented by means of said generation with a code to which changes made by the designer are to be added.

7. The method according to claim 1, wherein the method produces network management services with which the user of a network management system controls a telecommunication network.

8. A system for producing application-specific computer-controlled services, the system comprising:

a description file stored in a memory, the description file describing an application for an intended service and being formed with the terms of an application architecture used; and software generating means for generating an application-specific program code according to the rules of the application architecture used, wherein said software generating means are operationally coupled to separation means for separating a generated code into two different groups in such a way that one group (B) only contains a program code produced by said software generating means and the other group (C) contains such a generated code produced by said software generating means that is to be changed by a designer after the generation.

9. The system according to claim 8, wherein the separation means comprise said description and separate template files for each group.

10. The system according to claim 8, wherein it is a part of a network management system where the system is used to produce network management services by means of which the user of a network management system controls a telecommunication network.

* * * * *